(12) United States Patent
Krishnamurthy et al.

(10) Patent No.: US 11,003,782 B2
(45) Date of Patent: May 11, 2021

(54) PROTECTION OF PERSONALLY IDENTIFIABLE INFORMATION

(71) Applicant: AT&T Intellectual Property I, L.P., Atlanta, GA (US)

(72) Inventors: Balachander Krishnamurthy, New York, NY (US); Adam Christopher Bender, College Park, MD (US); Craig Ellis Wills, Acton, MA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/751,256

(22) Filed: Jan. 24, 2020

(65) Prior Publication Data
US 2020/0159935 A1 May 21, 2020

Related U.S. Application Data

(63) Continuation of application No. 15/631,087, filed on Jun. 23, 2017, now Pat. No. 10,579,804, which is a continuation of application No. 14/874,493, filed on Oct. 5, 2015, now Pat. No. 9,721,108, which is a continuation of application No. 12/624,012, filed on Nov. 23, 2009, now Pat. No. 9,172,706.

(51) Int. Cl.
| G06F 11/00 | (2006.01) |
| G06F 12/14 | (2006.01) |
| G06F 12/16 | (2006.01) |
| G08B 23/00 | (2006.01) |
| G06F 21/60 | (2013.01) |
| H04L 29/08 | (2006.01) |
| G06F 21/62 | (2013.01) |
| H04L 29/06 | (2006.01) |
| G06F 21/57 | (2013.01) |

(52) U.S. Cl.
CPC ............ *G06F 21/60* (2013.01); *G06F 21/577* (2013.01); *G06F 21/6263* (2013.01); *H04L 63/102* (2013.01); *H04L 67/02* (2013.01); *G06F 2221/2115* (2013.01); *G06F 2221/2119* (2013.01); *G06F 2221/2141* (2013.01)

(58) Field of Classification Search
CPC ....... H04L 63/102; H04L 67/02; G06F 21/60; G06F 21/577; G06F 21/6263; G06F 21/6254; G06F 21/6245; H04W 12/02
See application file for complete search history.

(56) References Cited

U.S. PATENT DOCUMENTS

| 5,848,412 A * | 12/1998 | Rowland ............. G06F 21/6209 |
| 7,215,667 B1 | 5/2007 | Davis |
| 8,418,233 B1 | 4/2013 | Hughes |
| 2002/0016777 A1 * | 2/2002 | Seamons ................ G06Q 40/04 705/76 |
| 2003/0041156 A1 | 2/2003 | Pickover |

(Continued)

*Primary Examiner* — Trong H Nguyen
(74) *Attorney, Agent, or Firm* — Guntin & Gust, PLC; Dana Lemoine

(57) ABSTRACT

Methods, systems, and products protect personally identifiable information. Many websites acquire the personally identifiable information without a user's knowledge or permission. Here, though, the user may control what personally identifiable information is shared with any website. For example, the personally identifiable information may be read from a header of a packet and compared to a requirement associated with a domain name.

20 Claims, 5 Drawing Sheets

(56) References Cited

U.S. PATENT DOCUMENTS

| | | |
|---|---|---|
| 2003/0181205 A1 | 9/2003 | Yiu et al. |
| 2004/0215707 A1 | 10/2004 | Fujita |
| 2004/0215823 A1 | 10/2004 | Kleinfelter |
| 2006/0195583 A1* | 8/2006 | Bellifemine ....... H04N 21/6582 709/227 |
| 2006/0262812 A1 | 11/2006 | Liu |
| 2010/0146583 A1* | 6/2010 | Prehofer ................ G06Q 10/10 726/1 |
| 2010/0251345 A1 | 9/2010 | James et al. |
| 2010/0268776 A1 | 10/2010 | Gerke |

\* cited by examiner

PROTECTION OF PERSONALLY IDENTIFIABLE INFORMATION

CROSS-REFERENCE TO RELATED APPLICATIONS

This application is a continuation of U.S. application Ser. No. 15/631,087 filed Jun. 23, 2017 and since issued as U.S. patent X, which is a continuation of U.S. application Ser. No. 14/874,493 filed Oct. 5, 2015 and since issued as U.S. Pat. No. 9,721,108, which is a continuation of U.S. application Ser. No. 12/624,012 filed Nov. 23, 2009 and since issued as U.S. Pat. No. 9,172,706, with both applications incorporated herein by reference in their entireties.

FIELD

The disclosed technology involves the protection of personally identifiable information ("PII"), especially when accessing websites.

BACKGROUND

Private information of users who access the Internet is often unwittingly shared with Internet websites without the users' knowledge or approval. For example, although users can choose which sites they visit ("first-party" sites), in many cases third-party sites gather and aggregate information about the users across multiple first-party sites. Users have at best limited capability to control what information of theirs is gathered. Additionally, users do not have a good understanding of how much of their private information is collected, processed, and stored by such third-party websites, and then possibly shared with others.

Third-party aggregators can collect various pieces of personally identifiable information ("PII") about a user across multiple sites, and users therefore need protection from inadvertently sharing their information with sites they do not explicitly visit. For example; PII leakage often occurs when users access Online Social Networking websites. (PII refers to any information that is identified by a user as information that the user does not want to share with an entity or entities.) Some websites have a legitimate need to obtain some of the pieces of PII—for example, an airline reservation website may need the passenger's name, credit card number, and billing address. However, some sites and aggregators obtain more pieces of PII than they need or than what the user may be willing to share.

Internet users can protect their privacy using browser mechanisms or proxy servers. Websites that store information about users give guarantees regarding access to that information via privacy policies; however such policies may or may not be legally enforceable. Privacy mechanisms often are a pre-packaged, non-negotiable set of options—a user can have information about them stored for the session or permanently. However, they cannot select what portion of their pieces of private information should be stored, for how long, and by whom. The choice they are left with is unsatisfactory—in order to be sure that their private information is not directly handed over as a result of their visit to a website or to a third-party aggregator associated with the site, they have to avoid visiting the site altogether.

SUMMARY

The disclosed technology provides a mechanism for a user to share PII with a website, for example, a third party website such as an aggregator website, that might be gathering information about the user. In accordance with one aspect of the disclosed technology, the user, rather than being limited to a pre-set collection of privacy options, has the option of controlling the amount their PII that will be shared with any web site or subset of web sites, based on the users trust of the website with which the information will be shared.

One embodiment of the disclosed technology is a computer readable storage medium encoded with computer executable instructions which, when executed by a computer, implements the operation of limiting an amount of user PII to be sent to a requesting website to a portion of the user's PII, the portion based on an amount of information the user is willing to share with a website having a level of user trust that the user has in the requesting website.

Another embodiment of the disclosed technology is a method of transferring personally identifiable information (PII) from a user to a receiving website, comprising receiving, at the receiving website, in response to a request from the receiving website for user PII, a portion of the requested PII, the portion being less than the amount requested and being determined by the trust level of the user in the receiving website.

DETAILED DESCRIPTION

Overview

Figure 1:
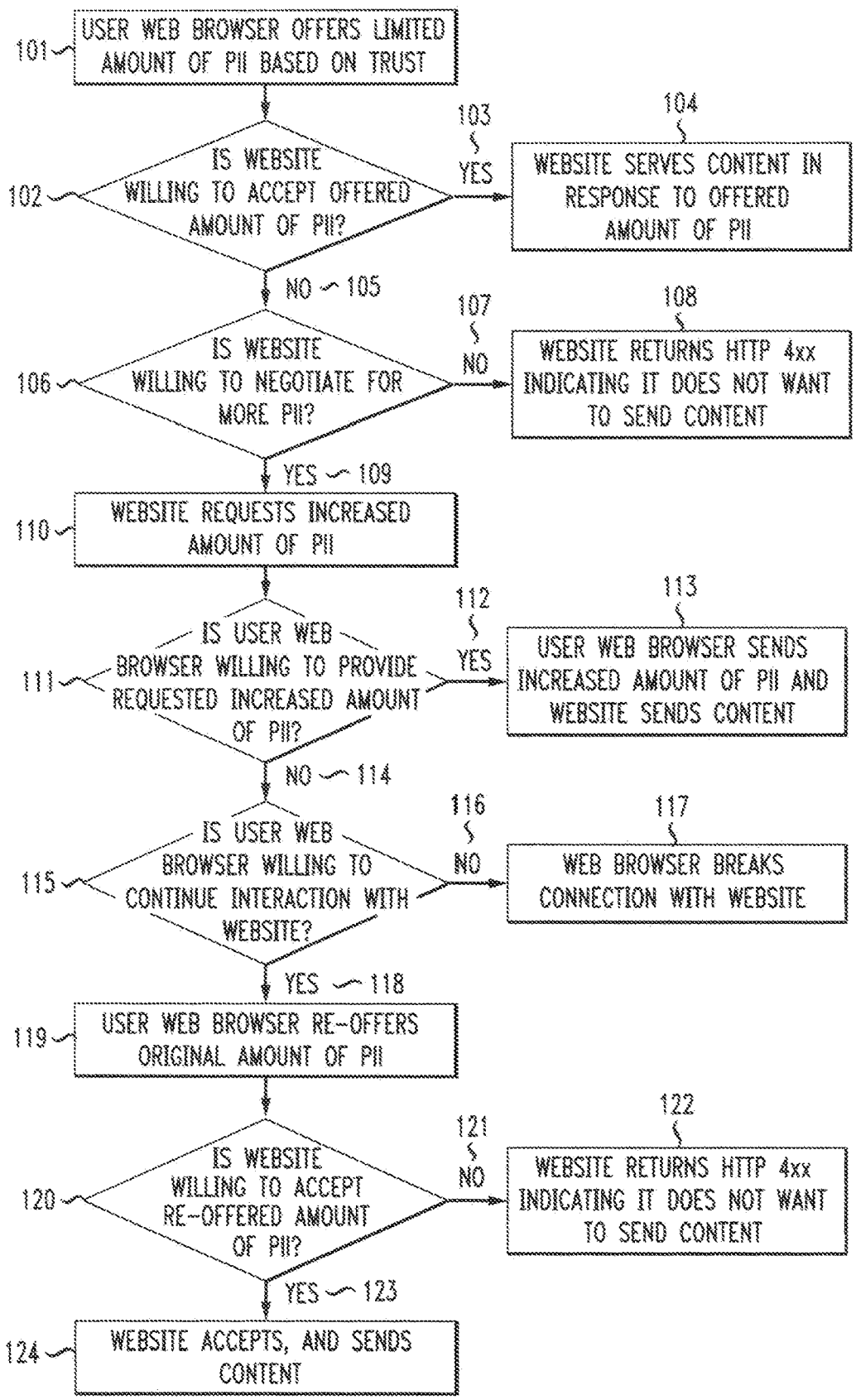
FIG. 1 is a schematic representation of a specific embodiment of an exemplary negotiation subprotocol according to the disclosed technology.

In accordance with one aspect of the disclosed technology, the user, rather than being limited to a pre-set collection of privacy options, has the option of controlling the amount of the users PII that will be shared with any website or subset of websites, based on the user's trust of the website with which the information will be shared. The disclosed technology, in one embodiment, includes a mechanism that allows negotiation with the receiving entity—e.g., a website, or aggregator that might be gathering information about the user. Based on the user's specifications, the disclosed technology determines what pieces of the user's PII the user is willing to share, and the requester is willing to accept, for a given web transaction. The amount of information shared could range from a very limited, non-zero portion of PII (maximal protection), to all the PII the requesting website wants. The disclosed negotiation scheme allows individual users/organizations to tailor their willingness to share pieces on a per-site and per-server basis. The scheme allows change over time as the trust level associated with a website and its associated servers grows. The user's trust level can increase or decrease as the user learns more about the website. (Although we refer to the user and the website, it will be clear to those of skill in this art that the relevant equipment may be a user client and/or a website server, or an entity acting on behalf of the user or website.)

In one embodiment, the disclosed technology may be implemented by a subprotocol that allows software to negotiate with an entity that desires user information. The software, working on behalf of the user, and based on the user's specifications, determines what pieces of information the user is willing to share in a given web transaction, and even the form that that information will take—e.g., a specific value or a range of values. For example, rather than sharing the user's specific age, or worse yet, their date of birth, the user shares a range of ages that includes the user's age, such as "25-34".

One embodiment of the disclosed technology involves the manner in which negotiation is conducted, followed by pruning of the pieces of PII to be shared based on the negotiation. The disclosed technology could include altering or removing HTTP headers, a common vehicle for carrying pieces of personally identifiable information (PII) to the aggregating site, modifying or preventing the transmission of cookies, altering the execution of JavaScript within the browser or blocking an entire HTTP request. Control may be exercised when a state is set in the browser's memory or the user's disks as well as when communication occurs with a website, such as a data aggregating site.

The disclosed privacy negotiation technology may include the methods by which a user's browser automatically responds to a website's request for certain pieces of PII based on the user's privacy preferences. A set of functions that are applied at the browser may carry out the required transformation on a user's pieces of PII to ensure tailored sharing. The set of functions are based on the values that are expected to be acceptable to the user and aggregating servers. These functions work to syntactically and semantically organize the contents of the information shared with the aggregating site. The functions can be shared within an organization so everyone is able to get a similar level of protection but could be further customized to meet strider requirements of privacy for individual users or when interacting with specific sites. The amount of PII to be shared can be determined based on prior agreement between the parties.

The choice of pieces of PII that will be shared may be determined as a result of dynamically applying a flexible set of functions based on the current information available to the user about the website that will receive the PII. The shared PII is not determined based on a whitelist. Site information available to a user may include the site's content and network properties, and the functions may try to ascertain the function of the website and the user's relationship with the site. A function can use cached information to improve efficiency. The functions provide the necessary degree of tailoring a specific HTTP header field, such as, for example, the Referer header field (one way by which privacy information leaks via Online Social Network websites) to ensure blockage of the leakage. The variations in the function may range from taking no action, to removal of some or all pieces of PII, up to removal of the entire header. As another example, applying a function to protect a user's true age may give a range of ages, rather than a specific age.

A specific embodiment of an exemplary negotiation subprotocol may proceed as shown in FIG. 1. By default, all potentially PII-revealing information (such as cookies and values in Referer header field) may be scrubbed by the user web browser that is accessing a website. However, as shown at 101, the user web browser, shown in FIG. 2 at 201, can be set to offer a limited portion of PII, based on the trust that the user has in the website, in exchange for content to be delivered by the website.

Figure 2:
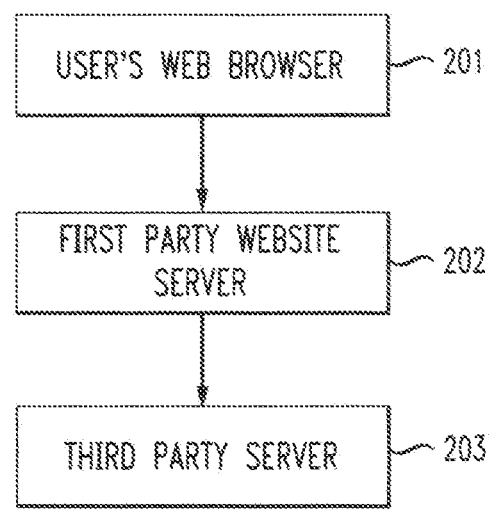
FIG. 2 is a high level schematic representation of a system that may be used in accordance with the disclosed technology.

At 102, the website, such as a first-party content provider, shown in FIG. 2 at 202, or a third-party aggregator, shown in FIG. 2 at 203, has to decide if it is willing to accept the amount of PII offered by the user web browser. If the website does accept, at 103, then at 104 the Website serves the requested content in response to the offered PII. If at 105 the website is not willing to accept the offered amount of PII, then at 106 it can decide if it wants to negotiate for more user PII. If at 107 the website does not want to negotiate for more user PII, then at 108 the website returns a message, such as an HTTP message in the range 4xx, indicating that it does not want to send content. If at 109 the website determines that it is willing to negotiate for more PII, then at 110 the website may request an increased amount of PII.

At 111, the user web browser decides if it is willing to provide the requested, increased amount of PII. (A piece of personally identifiable information (PII) may be a value of a single attribute that is specific to the user. Examples of pieces of PII include a user's first and last name, social security number, credit card number with expiry date information, and email address. In a particularly egregious scenario, the leakage of a set of particular pieces of PII can specifically identify the user, which could be considered highly undesirable by many users.) If at 112 the user web browser is willing to provide the requested increased amount of PII, then at 113 the user browser sends the increased amount of PII and the website send the content request by the user. If at 114 the user is not willing to provide the requested increased amount of PII, then at 115 the user web browser has to determine if it is willing to continue interacting with the web site. If at 116 the user web browser is not willing to continue interacting with the website, then at 117 the web browser breaks the connection with the web site. If at 118 the user web browser is willing to continue interaction with the website, then at 119 the user web browser may, for example, re-offer the original amount of PII. At 120 the web site must then decide if it is willing to accept the re-offered amount of PII. If at 121 the website is not willing to provide the requested increased amount of PII, then at 122 the website returns a message, such as an HTTP message in the range 4xx, indicating that it does not want to send content. If at 123 the website is willing to provide the requested increased amount of PII, then at 124 the website accepts and sends the requested content.

FIG. 2 is a high level schematic of a system for use in practicing the disclosed technology. The FIG. shows the user's web browser at 201, a first party website server at 202, and a third party server, such as that of an aggregator, if any, at 203.

A High Level Specific Implementation

A specific embodiment of the disclosed technology involves a negotiation subprotocol we have called Prenur™ that is implemented prior to sharing of any information. In this embodiment, a client server that implements the Prenur™ subprotocol may announce to a server that it does so by including the X-HTTP-Prenup header in an outgoing HTTP GET request. This announcement header is created by the client and may not contain any PII for maximum protection, or may include values entered by the user. If PII is to be included in the announcement header, or in later communicated headers, the header is followed by one or more fields, which may include either attributes or (attribute, value) pairs. The header indicates which attributes are negotiable or not (non-negotiable headers are prefixed with a "!" and may include an initial value). For example, in the Prenup© header "X-HTTP-Prenup: !Location=US", "Location" is the attribute, "US" is the value, and "!" means that the value will not be negotiated.

Users may determine how broad or narrow their values are through the use of broadening functions. A broadening function takes a value as input and returns a broader value. When Prenur™ places a PII value in an X-HTTP-Prenup header, it may call a broadening function on the true value to produce the value that is included in the header. For example, in the following, an exemplary header includes the user's age broadened to a 10-year range, their gender, and their location broadened to the state level, all as non-negotiable attributes:

X-HTTP-Prenup: !age=25-34, !gender=m,Iloc=US:NJ

Two types of fields may be defined—PII values, which pertain to the user, and filterable values, which pertain to the client. Values need neither be precise nor accurate. A PII field may take one of five formats: (1) a bare attribute, which is negotiable but has no initial value; (2) an attribute followed by a broadening function which represents the narrowest value the client is willing to apply; (3) an attribute with an initial value; (4) an attribute with a broadening function and an initial value; (5) a non-negotiable attribute with an initial value. Including a value in the header decreases the likelihood of an additional round-trip at the cost of perhaps unnecessarily disclosing PII. In a specific embodiment of Prenur™ seven pre-defined PII attributes are identified: age, email, gender, IP address, location, name, and phone number. Users manually enter PII values when they first use their browser, and the browser stores the values in the user's profile. The user can delete and edit the values as they wish.

Unlike PII values, filterable values are HTTP headers generated by the browser client. Prenur™ allows for the negotiation of the transmission of the headers that might leak PII, specifically, the Referer header field, User-agent, and Cookie headers. The presence of a filterable attribute in the X-HTTP-Prenup indicates that the client has edited or modified the named header but is willing to negotiate for the transmission of those values. Therefore, filterable attributes in an X-HTTP-Prenup header are never accompanied by a value or a '!' symbol. When transmitted, filterable values are not placed in an X-HTTP-Prenup header, rather, they are included in the HTTP request as per the HTTP specification.

Servers can respond to a request with an X-HTTP-Prenup in three different ways: accept the request (i.e., respond by sending the requested content), deny the request (by sending, for example, an HTTP error message), or negotiate for more information. The server may accept the request if the values in the X-HTTP-Prenup header (if any) satisfy the server's requirements for obtaining PII and return an HTTP 200. However, the server is free to modify the response body based on the values (or lack thereof) in the X-HTTP-Prenup header, either to remove content that the server administrator wishes to show only in exchange for a user's data, or to indicate to the user directly that they should provide more information to the server in future user requests. The server may deny the user request if it finds the presented information unacceptable—the client is not willing to provide the information, either initially or through negotiation, that the server requires. In this case the server returns a HTTP 4xx response along with an X-HTTP-Prenup header that lists the fields that the server requires in order to serve website content. This case is likely to be rare, since most web servers would return a modified version of their content, or no content, instead. Finally, the server can enter into negotiation for any negotiable attributes.

As a strategy to preclude the server from sending modified content, users might include all of their values in every request. This also avoids any delays due to negotiation. However, in such a situation, the user would be unnecessarily exposing private information to any site, even those that may not be interested in the information. Additionally, the user may be willing to share a certain piece of information, such as his email address, only under certain circumstances, rather than include it in every request. To resolve this issue, we use negotiation. Negotiation is the process by which a server may ask for more personal information from a client, and the client may decide whether or not to share that information.

Upon receiving an X-HTTP-Prenup header with a negotiable value, the server may initiate negotiation by responding with an HTTP 307 Temporary Redirect that includes the attributes of the values that the server wishes to receive and the broadening function it wishes to have applied to the values. An exemplary response is:

HTTP/307 Temporary Redirect

X-HTTP-Prenup: age:range(10),gender,user-agent

Here, the server wants to know the user's age within a range of 10 years, their gender, and their user agent string. The user may repeat the original GET request with a new X-HTTP-Prenup header that contains the negotiated values. (In an alternative embodiment, the user may decide that the site is asking for too much information and my elect to break communication with the site.) To transmit a filterable value that the server requested, the client includes the value in the appropriate HTTP header in the new request.

A High Level Specific Implementation—Examples of Messages Used in Prenur™

Figure 3:
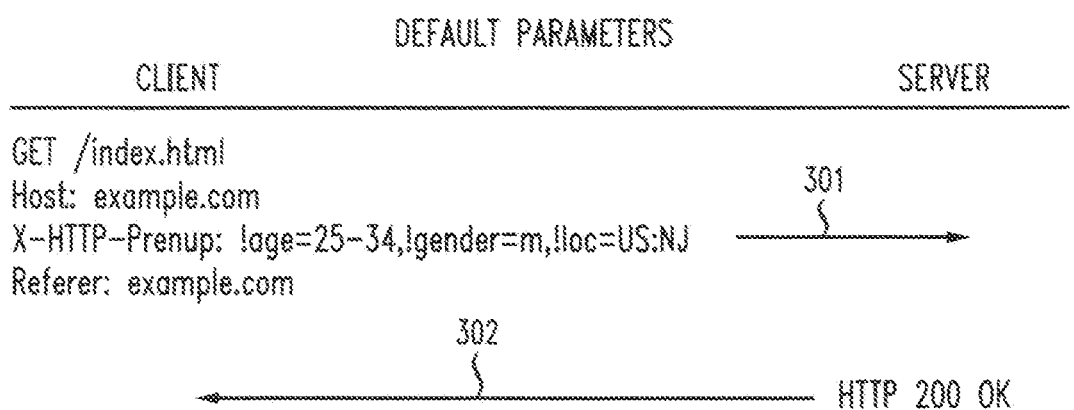
FIG. 3 shows the messages that are sent when default attributes and values are sent by a client.

FIG. 3 shows, at 301, default attributes and values sent by Prenup™ (editing any that the user may not have entered when the first setup Prenup™): the user's age within a 10-year range, their gender, and their location to the state level. The exclamation mark indicates, as mentioned above, that these values are non-negotiable. This set of defaults allows aggregators and websites to collect demographic information and serve tailored ads without uniquely identifying an individual. In FIG. 3, at 302, the server accepts the given values and returns the client-requested content.

Figure 4:
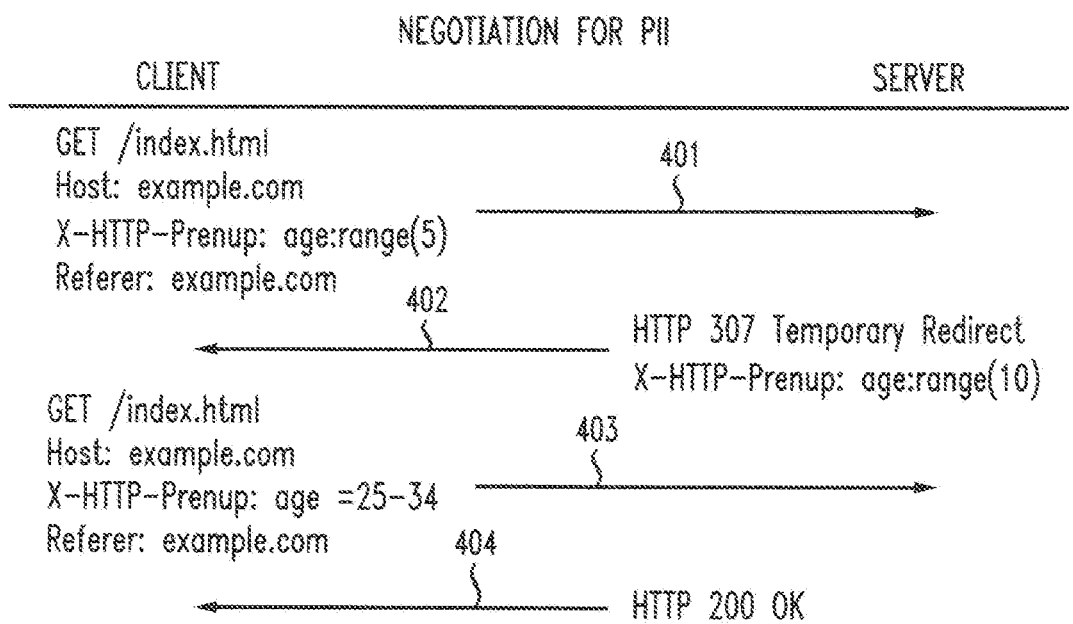
FIG. 4 shows the messages that are sent when the server and client negotiate for the transmission of a PII value.

FIG. 4 shows the server and client negotiating for the transmission of a PII value, namely the user's age, to within a 10 year range. Here, even though the client was willing, at 401, to divulge his age to within a range of 5 years, the server, at 402, indicates that it only desires to learn the user's age to within a range of 10 years. The client automatically complies, sending the new request at 403, and receives the response at 404.

Figure 5:
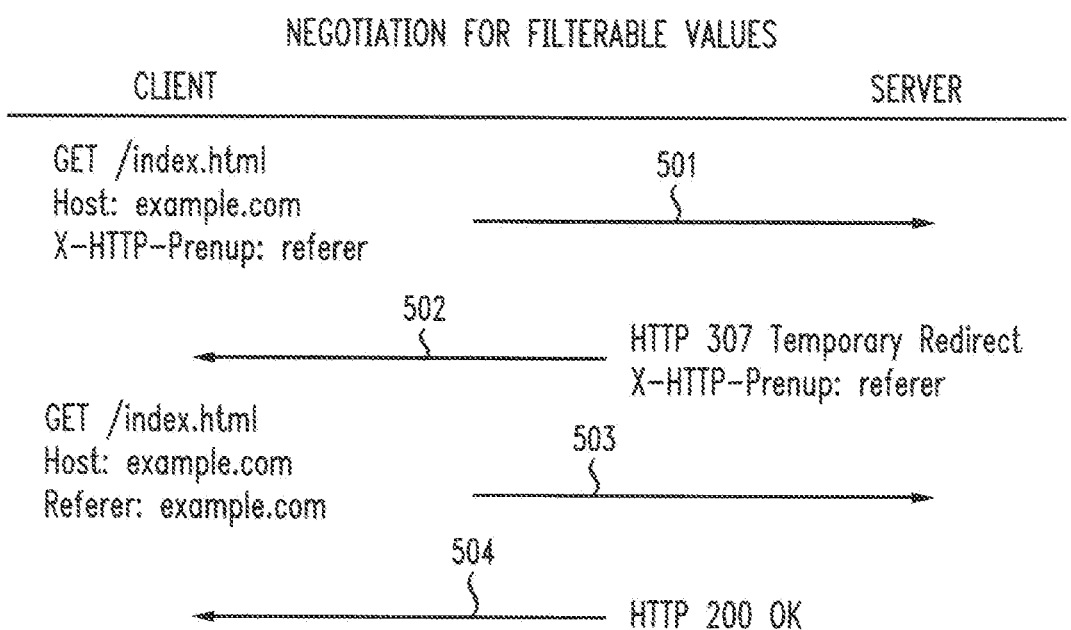
FIG. 5 shows the messages that are sent when the server and client negotiate for the transmission of filterable values.

FIG. 5 shows how a client and server negotiate for the transmission of filterable values. In the first request, at 501, the client offers to share the referrer only. At 502, the server asks for the referrer. In the second request, at 503, the negotiated value is not included in an X-HTTP-Prenup header, but rather as a normal header. In fact there is no X-HTTP-Prenup header at all, because there is no further information that the client wishes to convey to the server. At 504, the server accepts.

Figure 6:
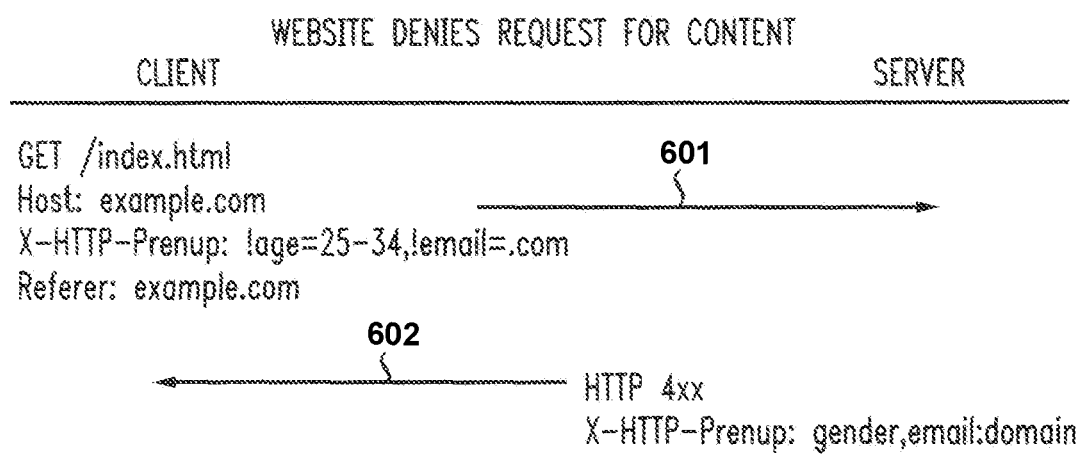
FIG. 6 shows the messages that are sent when a client does not include sufficient information to satisfy the server in its initial request and is not willing to negotiate for any values.

FIG. 6 involves a client that does not include, in its initial request, sufficient information to satisfy the server and is not willing to negotiate for any values. At 601, the client does not include the gender attribute in its request, and while the email attribute is present, it is broader than the server will require and is non-negotiable. At 602, the server is guarding its content by requiring that all users provide their gender and the full domain of their email address. Thus, the server denies the request, returning a HTTP 4xx code. Included in the denial response is an X-HTTP-Prenup header listing the attributes for which the server requires a value.

Figure 7:
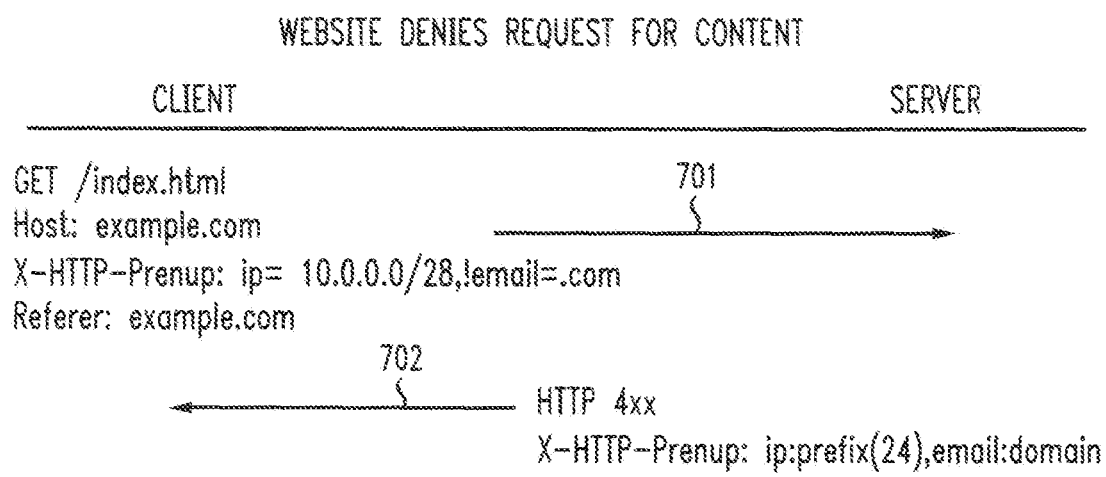
FIG. 7 shows the messages that are sent when a client does not include sufficient information to satisfy the server in its initial request.

FIG. 7 involves a client that does not include sufficient information to satisfy the server in its initial request. At 701, the client is willing to negotiate on some values, but it is not willing to negotiate for the values that the server requires. At 702, the server is guarding its content by requiring that all users provide the first 24 bits of their IP address and the full domain of their email address. The client includes their IP address attribute in its request, and while the email attribute is present, it is broader than the server requires and non-negotiable. Thus, the server denies the request, at 702, by returning a HTTP 4xx code. Included in the denial response is an X-HTTP-Prenup header listing the attributes for which the server requires a value.

Details of a Prenup™ Embodiment of the Negotiation Subprotocol—Overview

Prenup™'s negotiation subprotocol is realized via a HTTP protocol extension and thus in this embodiment will be supported by clients (browsers) and Web servers. The protocol extension introduces one new element—the X-HTTP-Prenup general header sent by a client to announce that it is Prenup™-capable and to transmit values, and sent by a server to indicate the values it requires from a client.

The value of an X-HTTP-Prenup header consists of an optional set of fields. A field has an attribute indicating the type of information in the field and a precision indicating the granularity of the information being presented or requested. Fields sent by a client also contain a value: data corresponding to the attribute at the given precision.

In this embodiment, communication is always initiated by a client, who inserts, by default, an empty X-HTTP-Prenup header in an HTTP request to a server. If the server requires some information from the client, then it enters into negotiation for that information. Negotiation is a process by which a server can request information from the client—either fields that were not included in the initial request, or values at a greater precision than present in the original request. The client accepts or rejects the negotiation request depending on the user's privacy settings. If the privacy settings allow the client to accept the servers request, then the client constructs an X-HTTP-Prenup header containing fields that satisfy the request and re-sends its initial HTTP request with the new X-HTTP-Prenup header. If the client rejects the servers request for additional information, it can either close the connection or indicate that no additional information will be provided. The client also has the option to short-circuit negotiation by including fields in the initial X-HTTP-Prenup header.

Details of a Prenup™ Embodiment of the Negotiation Subprotocol—Attributes

This embodiment of Prenup™ defines two types of attributes—personally identifiable information (PII) related to the user and filterable attributes that correspond to HTTP headers. To send PII values, the browser must collect and store those values. Once the user enters values into the browser, the browser stores them locally until deleted or modified by the user. The negotiation subprotocol can support any number of attributes, but in this embodiment eight PII attributes are defined: first name, last name, email, age, gender, phone number, IP address, and location. These attributes were chosen for their perceived utility to websites and ability to be defined more precisely.

Filterable attributes are those that the browser may alter or delete and currently include the Referer, Cookie, and User-agent headers. Some websites however rely on these headers for proper functioning. Thus this embodiment of Prenur™ lets a website request that a user temporarily stop filtering these headers. If a server successfully negotiates for a filterable attribute, the client does not include the attribute in an X-HTTP-Prenup header in its subsequent request, instead sending it as a normal header. Filterable attributes thus only appear in X-HTTP-Prenup negotiation requests from a server. The Prenur™ grammar can be extended to include other attributes, such as interests or financial information.

Details on a Prenup™ Embodiment of the Negotiation Protocol—Precision

Each PII attribute has several associated levels of precision. The precision of an attribute dictates roughly how much of the corresponding value is included in the X-HTTP-Prenup header. For example, instead of including a user's exact location and age in the header, this embodiment of Prenup™ allows the user to share only their region or country and an age range that contains their true age. In this embodiment, this transformation is not explicitly performed by the user, but by a function applied to the users input. This embodiment of Prenup™ supports the inclusion of different precision levels in different requests by changing the function it applies (automatically, in most cases), rather than requiring the user to re-enter values.

The value of any attribute can be left unchanged ("full"), or deleted entirely ("none"). In a specific embodiment, the additional pre-defined attributes-specific levels of precision are:

{first, last} name: initial
email: top-level domain, domain
age: range (with user-specified span)
phone number: country code, area code, exchange
IP address: prefix (with user-specified length)
location: country, state, ZIP code This embodiment of Prenup™ allows for additional transformation functions, both for the pre-defined attributes and additional attributes.

In this embodiment, for each PII value that the user enters into the browser, they also choose two levels of precision: the initial level, which is the level that is applied to the value in the initial X-HTTP-Prenup header, and the negotiable level, which is the level the user is willing to negotiate for if requested by the server. The default initial level for each attribute is "none"; i.e., by default no information is shared.

Details on a Prenup™ Embodiment of the Negotiation Subprotocol—The X-HTTP-Prenup General Header—Request Header Sent by a Client The X-HTTP-Prenup request header is a concise textual representation of each attribute and its user-supplied value at the precision desired by the user. If a precision level is set to "none", no field corresponding to that attribute is included in the header. The default initial header is thus an empty X-HTTP-Prenup header which simply announces the client's Prenur™-capability. Any field sent by a client has the form: attribute:level=value. The fields in an X-HTTP-Prenup header are separated by commas. For example, a user wishing to share their gender and zip code sends the following header: X-HTTP-Prenup: gender=m,location: zip=90210

Details on a Prenup™ Embodiment of the Negotiation Subprotocol—Exemplary Characteristics of a Client for Use with Prenup™

A Prenur™-enabled client will preferably collect the user's PIP values and preferences, format the values in an X-HTTP-Prenup HTTP header which is sent with outgoing HTTP requests, and participate in negotiation with a web server. The client may collect information from the user via a, preference window where the user may enter private information. Attributes that may be defined in Prenup™ include the user's name, age, location, email address, phone number, IP address, and gender. The user may enter a value for none, some, or all of these attributes. The supplied values may not be checked for correctness (though the browser should type-check the responses; i.e., if the type is defined as an integer then the value should be an integral one).

For each attribute, the user may have three additional choices: 1) whether to include that attribute's value in X-HTTP-Prenup header; 2) if so, how precise the included value is; and 3) whether the user is willing to negotiate for the release of more finer-grained (precise) information. For example, a user may enter their age, but indicate that their desired level of precision is only a 5-year span that includes their actual age. The user may enter their actual location, including state, city, and zip code, but express that only the state information should be included by default.

To enable negotiation, the user may set both a default precision and a maximum precision for each attribute. Values are sent at the default precision in initial requests, and if the server wishes to negotiate for a value at a greater precision than the default, the client will automatically retry the request at that greater precision as long as it does not exceed the maximum precision set by the user. A client does not indicate its maximum precision in outgoing requests; this is so that servers cannot always ask for values at the user's maximum precision without alerting the user.

Once the browser has obtained this information, it constructs an X-HTTP-Prenur™ header in certain outgoing HTTP requests. The X-HTTP-Prenup header is a concise textual representation of each attribute, its user-supplied value at the precision desired by the user, and an indication of whether or not the user is willing to negotiate on that attribute. This header may be included by default. The user may have the option of creating profiles, which are categories of websites. Profiles allow the user to send different default headers to different types of websites. Each profile may have a different default header, which is sent to each site in that profile. For example, a user may create a "Bank" profile that includes fiduciary sites and constructs an X-HTTP-Prenup header with the user's full name and phone number, while a "Sports" profile may include the users location and email address but no other information.

After sending an X-HTTP-Prenup header to a server, the client may receive one of three responses: the information may be accepted by the website and the content sent, the information may not be accepted and the request for content denied, or the server may wish to enter into negotiation. The first two cases may not require changing the browser software—a server that accepts the Prenup™ header returns an HTTP 200 OK and one that does not accept a request based on the Prenup™ header returns an HTTP 4xx. However, negotiation is a new interaction that is preferably implemented in the browser.

If a server wants to negotiate for additional user information, it returns the corresponding HTTP response code and an X-HTTP-Prenup header that specifies the information it desires. The browser preferably must interpret this response and take one of two actions. If the user has specified willingness to share the information at the requested precision, the browser will retry the request at the requested precision. If the request is for greater than the maximum allowed precision, the browser informs the user that the server is requesting more information than the user has indicated willingness to share. The user then has the option of manually reconfiguring preferences to complete the request or giving up on viewing the content.

Details on a Prenup™ Embodiment of the Negotiation Subprotocol—the X-HTTP-Prenup General Header—Request Header Sent by a Server The X-HTTP-Prenup response header includes the attributes with the desired precision of the corresponding value sought by a server. A server sends an X-HTTP-Prenup header to initiate negotiation. Any field sent by a server has the form: attribute:level. An example request for a 10-year age range, an exact location, and the user-agent string is: X-HTTP-Prenup: age:range(10), location:full, user-agent: full Details on a Prenup™ Embodiment of the Negotiation Subprotocol—Exemplary Characteristics of a Server for Use with Prenup™

To implement Prenup™, a server will preferably have to perform three tasks: (1) for each resource, determine what, if any, PII attributes a client preferably must send in order to access the resource; (2) parse X-HTTP-Prenup headers in HTTP requests to determine what values a client is presenting; and (3) respond appropriately to the presented information, whether it be to transmit an object, deny the request, or enter into negotiation. Prenup™ allows web servers to collect information from browsers that request hosted pages, with the option of making certain pages available only to clients that include a minimum amount of Prenup™ information in their requests. In such cases, the web site operator preferably must determine the minimum amount of information. The server preferably must be able to store these preferences and ensure they are satisfied before returning any content that requires the client to present information. This is similar to how access controls work, where the client can be considered to "authenticate" to the web server by presenting Prenur™ information.

A web server preferably is able to recognize and interpret Prenur™ information from the client. This entails retrieving the X-HTTP-Prenup header and implementing a parser that constructs an internal representation of the values presented in the header. Once the internal representation of the Prenur™ information is constructed, the server preferably compares the information presented to the information (if any) that the client is required to send in order to view the requested content. Depending on the result of this comparison, the server will preferably take one of three actions: (1) return, the requested information; (2) deny the request; or (3) enter into negotiation with the client. In every case, the server logs any presented Prenur™ information. In the first case the server returns the page with a 200 OK status code. In the second case the server issues a Precondition Failed error code. In the third case, the server constructs an X-HTTP-Prenup header naming the information that it requires in order to return the requested content. It sends this header in a 307 Temporary Redirect response that redirects the client to the same URL. The client may choose to request the content again with the required amount of information.

Details on a Prenur™ Embodiment of the Negotiation Subprotocol—Negotiation

Negotiation is the process by which a server may request information from a client, with the client deciding whether or not to share that information. When a server receives an HTTP request that contains an X-HTTP-Prenup header, it may negotiate for information from the user by inserting its own X-HTTP-Prenup header in an HTTP 307 Temporary Redirect response. The response redirects to the same URI that the client requested. An example negotiation was shown in FIG. 3 where, at the 301, the client sends an empty X-HTTP-Prenup header which simply announces the client's Prenup™-capability. At 302 the server, responds indicating that it wants to know both the users age within a range of 10 years and the Referer header.

When presented with that negotiation request, the client compares the requested precision level of every attribute in the request against the user's negotiable precision level. If the user's negotiable level is at least as precise as the requested precision level for all requested attributes, then, as shown at 303, the client repeats the original GET request with a new X-HTTP-Prenup header containing the negotiated values at the precision requested by the server. To transmit a filterable value that the server requested, the client includes the value in the appropriate HTTP header in the new request.

If, however, the server requests information that the client is not willing to share, then the client has one of two options. It may close the connection, which saves time and bandwidth in the case that the server will not send a response. The client may also choose to respond with an X-HTTP-Prenup header whose value consists solely of '!', to indicate that the client will not share the requested information while letting the server substitute different, yet still useful, content instead.

This design gives incentive to a server to negotiate for the minimum amount of information it actually requires: if it asks for too much, the client may deny the request. By continuing the negotiation, a server may try to obtain information that it desires, but does not need. If the value gained by the server from the users that provide the requested information is less than the value lost by negotiation attempts that are rejected by unwilling users, then the server has no incentive to partake in such negotiation. More importantly, the negotiation request from the server is visible to the client. A server that regularly requests detailed levels of information may be viewed as a privacy-risk.

Details on a Prenur™ Embodiment of the Negotiation Subprotocol—Negotiation Profiles and Privacy Summaries Users may want to have more than one set of precision levels for a given attribute, depending on with whom they are communicating. For instance, a user may have no problem sharing their exact age with their bank, but not want to share any age information with an aggregator. To do so, users can create negotiation profiles, or collections of websites to which the same precision levels will apply. When a client sends a request to a site, it sends the initial X-HTTP-Prenup header associated with the appropriate profile for that site and responds to negotiation requests according to that profile's settings.

This embodiment of Prenur™ provides a privacy summary to help users determine which sites they want to block and which negotiation profile the want to assign to any given site. The summary may include: 1) a per-website report of the number of requests to that site (more specifically, to any site that shares the same Authoritative Domain Name Server ("ADNS")) that were blocked; 2) the number of cookies that were removed from third-party requests to that site; and 3) the value in any Referer header field, or of any cookie, or request URI, in which presence of PII was detected. When started, Prenur™ clears existing privacy summaries and then begins a new summary for every site the browser (directly or indirectly) visits. The user can view or clear summaries on demand.

By using privacy summaries, a user can see which sites are attempting to track them, what information they are trying to gather via HTTP headers, and exactly what, if any, PII goes to them. If the user finds a site that attempts to collect more information than the user is comfortable with, the user could place it in a negotiation profile that does not offer any information. The user may be more amenable to negotiating with sites that are viewed as less intrusive.

Specific Examples of Prenup™ Capabilities

Prenur™ provides users different ways to control the amount of private information that is shared with websites in which they interact. In the following we discuss various privacy leakage control scenarios with Prenup™ and results from a browser extension implementation. Note that Prenup™ is useful even if the server is not Prenur™-aware as the summary and filtering (content sanitization) parts of Prenup™ will work independently of the server.

Example 1—Informing the User of PII Leakage and Tracking

As discussed, a privacy summary informs the user of what values are being sent in cookies, request-URIs, and Referer headers to every site that the browser visits, either directly or indirectly. The privacy summary highlights PII leakage in these values.

Example 2—Blocking Requests to Known Aggregators

Figure 8:
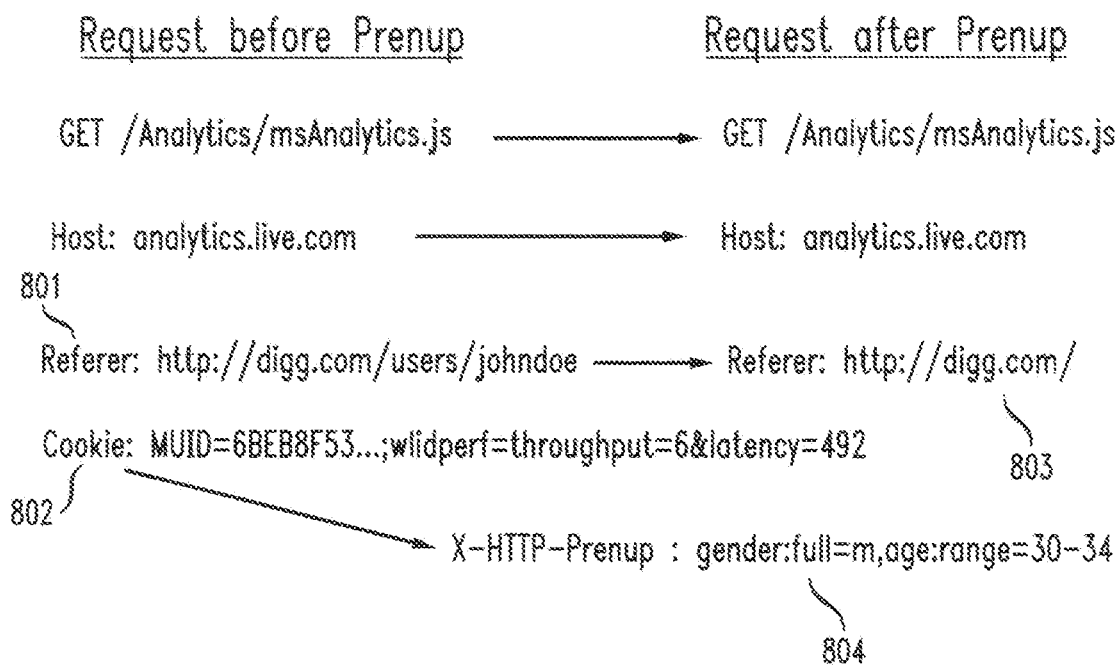
FIG. 8 shows fields that Prenur™ removed, because they leak PII, and replaced with user-controlled information.

An aggressive privacy leakage control policy enabled by Prenur™ is the ability to block requests to known aggregators. Unlike tools such as AdBlock, Prenur™ also identifies and blocks hidden third party servers that appear to be part of a first-party site as shown in FIG. 8. Here the PII in the Referer header field, 801, and the cookie, 802 are respectively blocked as shown in 803 and 804.

Example 3—Removing Cookies in Requests to Third-Party Servers

Rather than block retrieval of all third-party objects, a less aggressive action is to allow the requests, but remove all cookies sent to these servers to inhibit tracking via cookies. While browsers ostensibly have this feature, preventing transmission of cookies to hidden third-party servers is not available. Without this feature of Prenup™™, cookies containing a user's OSN identifier, zip code, and email address, would be sent to a server controlled by a third-party.

Example 4—Blocking or Truncation of Referer Header

The Referer header is one common means of leakage for a user's OSN identifier. For example, a user's username "johndoe" may be sent as part of the request to the aggregator analytics.live.com, allowing live.com to associate an identity with the tracking cookie that this aggregator employs. With Prenup™, a user has the option of allowing requests to aggregators, but sanitizing them to protect privacy. For example, a request may be modified by truncating the Referer header field and removing a cookie, but offering demographic information to the server instead.

Example 5—Detection and Truncation of Known PII in Request—URI

Another aspect of third party object retrieval from sites, such as OSNs that store a user's PII, involves the transmission for, for example, the user's age, gender, and zip code to a third party server. Because the Prenur™ extension is explicitly given some of these pieces of PII by its user, it can look for their values in the request-URI.

Example 6—Negotiation

Once the leakage of private information to third-party aggregators is better controlled, the Prenur™ extension and subprotocol provide means for an aggregator to negotiate for pieces of information it deems necessary to satisfy the request. Using Prenup™, a user is able to define which pieces of private information the user is willing to share with aggregators either individually or collectively. Once enabled (a user may be willing to share no information), negotiation could be requested by a server in response to a client request. For example, if a website requires a user's email address then it could make such a request using the 307 Temporary Redirect response defined above, but the user could refuse to provide such information. Instead, if the website requested an age range then a user may be more willing to provide this information and the resulting request would succeed.

Example 7—Location Based Services

As a final use case, consider a website that wants to serve local weather information to a user. Servers can and do use IP location services to determine a user's current location, but such services are not always accurate. Prenur™ provides a mechanism for the server to request a user's base location to some degree of precision. In this case, the client's initial request contains an empty X-HTTP-Prenup header, which allows the server to ask for the client's base location. Then, the client can respond with the requested information and receive the local weather report.

A Specific Implementation of Prenup™—Overview

In this embodiment, the Prenur™ client is implemented as a Firefox extension primarily because Prenup™ needs access to a user's private information. Prenup™ could also be implemented through a trusted proxy. Prenup™ needs to interact closely with web-browsing activity to inject headers into HTTP requests. Implementing Prenup™ as a standalone application that monitors network or process activity incurs unnecessary complexity and limits the architectures for which Prenup™ can be used. We implemented Prenup™ in XUL and JavaScript, rather than binary XPCOM components, allowing it to be installed on any host that runs Firefox. Prenup™ does not require any features specific to Firefox and can be implemented in other browsers either natively or as extensions.

A Specific Implementation of Prenup™—Client Implementation

This client implementation consists of two major components: content sanitization and negotiation. Sanitization reduces privacy leakage via HTTP-based methods. Nego-tiation allows users to share personal information with web servers in a manner they control.

A Specific Implementation of Prenup™—Client Implementation—Preventing PII Loss

As detailed above, leakage occurs via HTTP in three key ways: in URIs in the Referer header field, in third-party cookies, and in request URIs themselves. Prenur™ allows users to block each type of loss. A client's IP address is another form of leakage (useful to obtain a user's current location through various IP location services). Prenur™ could inhibit such leakage by redirecting requests for non-trusted servers to an anonymizing proxy, although the current implementation does not do so. While Prenup™ currently does not directly mitigate Flash cookies or browser history attacks, it does allow users to block third-party requests (including for Flash objects) based on a blacklist.

Referer Header.

Users have three options: to remove the header completely, to remove the path portion following the hostname, or to leave the header untouched. Prenup™ uses the nsl-HeaderChannel interface to modify the header value just before the request is sent. Prenup™ allows the user to alai remove the User-Agent header via the same mechanism, although this feature is not enabled by default as several websites serve browser-specific content and do not function correctly unless this header is present. FIG. 6 demonstrates Prenup™ s header filtering ability.

Third-Party Cookies.

The user has the option to allow or deny all third-party cookies. If the user chooses to deny third-party cookies, Prenup™ removes the appropriate header from outgoing requests in an implementation of the nslHeaderChannel interface. Existing browsers use a simple syntactic comparison to determine if a server belongs to a third-party. However the presence of "hidden" third-party servers, where a server appears to be part of the first-party domain but is in fact controlled by a third-party, has been shown through examination of the authoritative DNS (ADNS) for servers. Determining whether a cookie is being sent to a first party or a third party is thus not always straightforward. If the cookie is being sent to the same host as the first-party site, or a site with the same ADNS server, then Prenup™ considers it to be a first-party cookie, otherwise it is a third-party cookie and may be removed depending on the user's preference.

Request URIs.

By serving pages that cause a browser to request an object from an aggregator, websites allow these aggregators to track their visitors. PII may be included in the requested URI itself. To prevent such leakage, the entire request must be blocked. Firefox internals include such a capability through its nslContentPolicy interface, which defines a method, shouldLoad, that is called before every request for an embedded object is made. If shouldLoad returns true, Firefox makes the request, otherwise, the request is canceled. In the case of multiple nslContentPolicy implementations, Firefox only makes the request if all return true, and short-circuits whenever one returns false.

Prenup™'s implementation of shouldLoad performs two types of tests: syntactic checks for obvious PII leakage and comparisons against a blacklist of known aggregators. If any cross-host request matches any of a set of regular expressions, then the request is blocked. The Prenup™ implementation can also be extended to search for PII based upon the values, such as age or zip, entered by the user. We do not expect this technique to catch all instances of URI-encoded PII leakage, nor for it to always be effective in the future as websites observe clients blocking such requests. The introduction of this option both allows users to better understand the private information being leaked to websites as well as requiring websites to request such information rather than simply be given it by the first-party as part of the request-URI.

Prenup™ also blocks certain requests based on the destination hostname by comparing the hostnames of the requested object and the object that made the request. If the hostnames are the same, the request is allowed. Otherwise, the requested hostname is compared against a blacklist of sites known to be owned by aggregators (currently 97). If the request matches any of these, the request is denied.

Prenup™ uses the getBaseDomain function of the nsIEffectiveTLDService to canonicalize domain names for comparison. This function returns the "highest-level domain under which individual domains may be registered". For example, a request for img.ads.example.co.uk would match the blacklist entry www.example.co.uk, because getBaseDomain transforms both hostnames to the domain name example.co.uk. However, a hostname-only blacklist is insufficient, as aggregators can add hostnames faster than a blacklist can keep up. To catch requests to sites that are owned by aggregators but are not on the blacklist, Prenup™ compares authoritative DNS servers (ADNS). Prenup™ stores the ADNS of each blacklisted hostname. The final check in shouldLoad is to determine the ADNS of the requested host and see if it matches any of the blacklisted ADNSes. The same TLD-based comparison as described in the previous paragraph is done on ADNS names. Some aggregators, such as abmr.net and overture.com use CDNs like Akamai to host their ADNS, while others, such as bluekai.com and tacoda.net use managed DNS services like UltraDNS. Because many non-aggregator sites also deploy DNS this way, there is a potential for false positives. Thus Prenup™ whitelists such shared DNS hosting.

Unfortunately, Firefox does not provide built-in support for nameserver lookups. The nsIDNS Service exports functions that only resolve hostnames. Therefore, the Prenup™ extension implements its own DNS client using UDP sockets. We had to write JavaScript code to construct a DNS query, read the response from the socket and parse it, and extract nameservers from NS and SOA records. Because this implementation of Prenup™ is not able to use lowlevel DNS functions, it cannot read the client host's DNS settings. Therefore, it requires the user to enter the IP address of a DNS server to query. The extension maintains a local DNS cache, so that no hostname triggers more than one DNS lookup per browsing session. FIGS. 5 and 7 show requests that may be blocked for two reasons: the request—URI contains PII and they are sent to a site whose ADNS is blocked. The request URI blocking policy is more complicated than the third-party cookie policy because in many cases, third party requests are legitimate and desired by the user. Therefore, we use a default-allow policy that only blocks requests to known aggregators. On the other hand, at this time we are not aware of any use for third-party cookies other than to track users. However, if this were the case, a middle-ground between blocking and allowing such cookies would be advantageous.

A Specific Implementation of Prenup™—Client Implementation—Negotiation

The negotiation component of Prenur™ has three phases: collecting the user's personal information and preferences, formatting and inserting the values in an X-HTTP-Prenup header in (some) outgoing requests, and participating in dynamic negotiation with a server.

Data collection is done once, when a new browser profile is created. The extension has a preferences window where users can enter their personal information for inclusion in X-HTTP-Prenup headers. The values are stored as preferences for that browser profile. The preference window has fields for the user's name, age, location, email address, phone number, IP address, and gender. The user may enter a value for none, some, or all of these attributes, and the supplied values are not checked for correctness.

For each attribute, the user has two additional choices: the initial and negotiable precision levels. For example, a user may enter their actual age, but indicate that they are willing to negotiate for only a 5-year span that includes their actual age, or the user may enter their actual location, including country, state, and zip code, but express that only the country information should be included in initial requests. Prenur™ will automatically answer negotiation requests for any level of precision less than or equal to the negotiable level.

Once the browser has obtained this information, it constructs an X-HTTP-Prenup™ header and inserts it in outgoing HTTP requests using the nsIHttpChannel. This default header is empty and serves only to announce the client's ability to negotiate; however, the user may select certain attributes to appear in this default header. The headers sent in an instance of negotiation are captured in FIG. 8.

Users may set their preferences once and then forget their settings. This could lead to unintentional user-mandated privacy loss if a user sets an attribute's negotiable precision to "full" (to interact with a single website) and forgets to change it back. To curb such instances, when Firefox starts, our implementation alerts the user to any attributes whose precision level is "full".

A Specific Implementation of Prenup—Server Implementation

A Prenup™-capable server can be implemented with WEBrick, an HTTP server included in the default Ruby installation. WEBrick can be modified to associate each page it serves with a (possibly empty) set of Prenup fields that represents the values a client must provide in order to view the page. The server parses X-HTTP-Prenup headers in incoming requests and determines if the provided values satisfy the page's requirements. If so, the server sends the page. If not, then the server enters negotiation by sending a 307 Temporary Redirect that includes the required fields as an X-HTTP-Prenup header. This response gives the client a chance to provide the required values if it is willing.

Additional Embodiments

A TTL (time-to-live) can be added to the information passed to a Website indicating the duration that the PII can be retained by the site. This is analogous to a Website sending a cookie to a browser along with the duration in which that cookie should be retained by the browser.

A user may also choose to obscure their IP address. In such case the user's browser preferably must not communicate directly with the Website, but rather go through some intermediary, such as a proxy, so that the Website sees the IP address of the intermediary and not that of the users machine.

Computer instructions to implement the disclosed technology on a computer may be encoded on a computer readable medium for later execution. The term computer readable storage medium encompasses many forms known to those of ordinary skill in this art. In alternative embodiments, the term computer readable storage medium may be limited to physical storage media such as an EPROM, a CD, or a DVD of other physical storage media.

Figure 9:
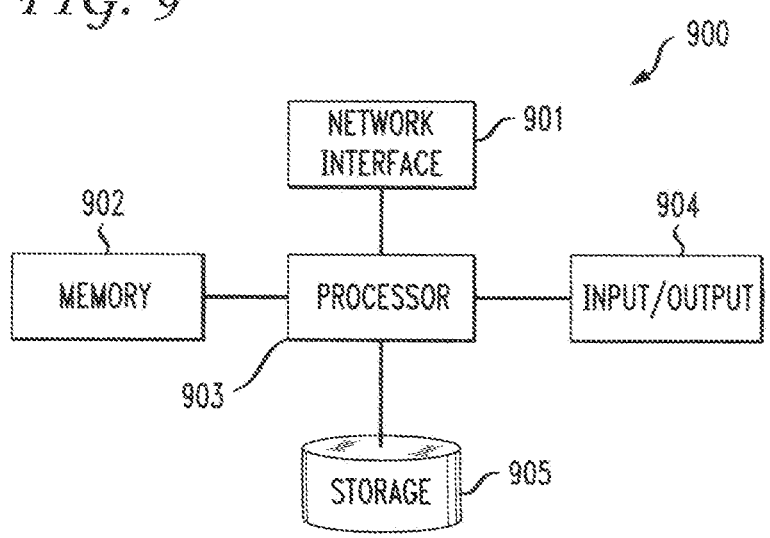
FIG. 9 is a schematic representation of a computer that may be used to implement the disclosed technology.

FIG. 9 shows a high-level block diagram of a computer that may be used to carry out the disclosed technology. Computer 900 contains a processor 903 that controls the overall operation of the computer by executing computer program instructions which define such operation. The computer program instructions may be stored in a storage device 905 (e.g., magnetic disk, database) and loaded into memory 902 when execution of the computer program instructions is desired. Thus, the computer operation will be defined by computer program instructions stored in memory 902 and/or storage 905, and the computer will be controlled by processor 903 executing the computer program instructions. Computer 900 also includes one or more output network interfaces 901 for communicating with other devices. Computer 900 also includes input/output 904 representing devices which allow for user interaction with the computer 900 (e.g., display, keyboard, mouse, speakers, buttons, etc.). One skilled in the art will recognize that an implementation of an actual computer will contain other components as well, and that FIG. 9 is a high level representation of some of the components of such a computer for illustrative purposes. It should also be understood by one skilled in the art that the method of the current disclosed technology may be implemented on a device such as is shown in FIG. 9 by, for example, utilizing appropriate computer instructions as described herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments of the disclosed technology shown and described herein are only illustrative of the principles of the claimed invention and that various modifications may be implemented by those skilled in the art without departing from the scope and spirit of the invention. Those skilled in the art could implement various other feature combinations without departing from the scope and spirit of the invention. Accordingly, it should be understood that the claimed invention may be broader than any given embodiment described in this specification, or than all of the embodiments when viewed together. Rather these embodiments are meant to describe aspects of the disclosed technology, not necessarily the specific scope of any given claim.

The invention claimed is:

1. A method, comprising:
   receiving, by a server, a first request for a content from a client device, the first request for the content specifying an offer to reveal a first personally identifying information value and another personally identifying information value in exchange for the content, wherein the first personally identifying information value is specified in a first header of the first request as a negotiable value, and wherein the another personally identifying information value is specified in the first header of the first request as a non-negotiable value by associating the another personally identifying information value with a non-negotiable indicator;
   in response to determining by the server that the first request for the content includes the first personally identifying information value that is negotiable, sending, by the server, a second request to the client device with a second header specifying a second personally identifying information value that is more precise than the first personally identifying information value in exchange for the content; and
   receiving, from the client device, a subsequent request for the content with a third header including the second personally identifying information value in response to the second request from the server being accepted by privacy settings of the client device.

2. The method of claim 1, wherein the first personally identifying information value comprises a first age range.

3. The method of claim 1, wherein the second personally identifying information value comprises a second age range.

4. The method of claim 1, further comprising:
   receiving, by the server, the second personally identifying information value from the client device; and
   sending, by the server, the content to the client device.

5. The method of claim 1, wherein the first request for the content from the client device further specifies the offer to reveal a third personally identifying information value in exchange for the content, wherein the third personally identifying information value is specified in the first request as a non-negotiable value.

6. The method of claim 1, wherein the receiving the first request for the content from the client device comprises receiving the first request for the content from a web browser executed by the client device.

7. The method of claim 1, wherein the first personally identifying information value comprises a first location value.

8. The method of claim 1, wherein the second personally identifying information value comprises a second location value.

9. A system, comprising:
   a hardware processor; and
   a memory device, the memory device storing code, the code when executed causing the hardware processor to perform operations, the operations comprising:
   receiving a first request for a content from a client device, the first request for the content including a first personally identifying information value and another personally identifying information value, wherein the first personally identifying information value is specified in a first header of the first request as a negotiable value, and wherein the another personally identifying information value is specified in the first header of the first request as a non-negotiable value by associating the another personally identifying information value with a non-negotiable indicator;
   in response to determining that the first request for the content from the client device includes the first personally identifying information value that is negotiable, sending a second request to the client device with a second header specifying a second personally identifying information value that is more precise than the first personally identifying information value in exchange for the content; and
   receiving, from the client device, a subsequent request for the content with a third header including the second personally identifying information value in response to the second request being accepted by privacy settings of the client device.

10. The system of claim 9, wherein the first personally identifying information value comprises a first age range.

11. The system of claim 10, wherein the second personally identifying information value comprises a second age range.

12. The system of claim 9, wherein the operations further comprise:

receiving the second personally identifying information value from the client device; and sending the content to the client device.

13. The system of claim 9, wherein the first request for the content from the client device further includes a third personally identifying information value, wherein the third personally identifying information value is specified in the first request as a non-negotiable value.

14. The system of claim 9, wherein the receiving the first request for the content from the client device comprises receiving the first request for the content from a web browser executed by the client device.

15. The system of claim 9, wherein the first personally identifying information value comprises a first location value.

16. The system of claim 15, wherein the second personally identifying information value comprises a second location value.

17. A memory device storing instructions that when executed cause a hardware processor to perform operations, the operations comprising:

receiving a first request for a content from a client device, the first request for the content including a first personally identifying information value and another personally identifying information value, wherein the first personally identifying information value is specified in a first header of the first request as a negotiable value, and wherein the another personally identifying information value is specified in the first header of the first request as a non-negotiable value by associating the another personally identifying information value with a non-negotiable indicator;

in response to determining that the first request for the content from the client device includes the first personally identifying information value that is negotiable, sending a second request to the client device with a second header specifying a second personally identifying information value that is more precise than the first personally identifying information value in exchange for the content; and receiving, from the client device, a subsequent request for the content with a third header including the second personally identifying information value in response to the second request being accepted by privacy settings of the client device.

18. The memory device of claim 17, wherein the first personally identifying information value comprises a first age range.

19. The memory device of claim 18, wherein the second personally identifying information value comprises a second age range.

20. The memory device of claim 17, wherein the operations further comprise:

receiving the second personally identifying information value from the client device; and sending the content to the client device.

* * * * *